(12) United States Patent
Gartrell (10) Patent No.: US 7,224,945 B2
(45) Date of Patent: May 29, 2007

(54) MOBILE STATION HAVING OVERLAPPING TRANSLUCENT MATERIAL LAYERS AND METHOD OF FORMING THE SAME

(75) Inventor: Andrew Julian Gartrell, Oak Park, CA (US)

(73) Assignee: Nokia Corporation, Espoo (FI)

( * ) Notice: Subject to any disclaimer, the term of this patent is extended or adjusted under 35 U.S.C. 154(b) by 423 days.

(21) Appl. No.: 10/458,453

(22) Filed: Jun. 10, 2003

(65) Prior Publication Data

US 2004/0253932 A1 Dec. 16, 2004

(51) Int. Cl.
*H04B 1/38* (2006.01)

(52) U.S. Cl. .................. 455/90.3; 455/575.1; 455/566; 379/433.01; 379/433.07; 345/170; 200/313; 200/314

(58) Field of Classification Search ................ 455/566, 455/575.1, 90.1–3, 351; 379/433.01, 6, 433.07, 379/368; 345/169, 170; 341/22, 23; 200/310–317, 200/5 A, 517, 341–345
See application file for complete search history.

(56) References Cited

U.S. PATENT DOCUMENTS

| | | | |
|---|---|---|---|
| 5,138,119 A | | 8/1992 | Demeo |
| 5,401,927 A | * | 3/1995 | Lundell et al. ............. 200/314 |
| 5,408,060 A | * | 4/1995 | Muurinen ................... 200/314 |
| 5,431,697 A | | 7/1995 | Kamata et al. |
| 5,721,059 A | | 2/1998 | Kito et al. |
| 6,088,068 A | * | 7/2000 | Halttunen et al. ............ 349/12 |
| 6,180,048 B1 | * | 1/2001 | Katori ........................ 264/400 |
| 6,466,299 B1 | * | 10/2002 | Lehtiniemi et al. ......... 349/199 |
| 6,600,904 B1 | * | 7/2003 | Wang ....................... 455/550.1 |
| 6,718,188 B1 | * | 4/2004 | Ohira et al. ............. 455/575.1 |
| 6,771,938 B2 | * | 8/2004 | Lustila et al. .......... 379/376.01 |
| 2002/0052209 A1 | * | 5/2002 | Frohlund .................... 455/456 |
| 2002/0065054 A1 | | 5/2002 | Humphreys et al. |
| 2002/0076512 A1 | | 6/2002 | Kreider |
| 2002/0177470 A1 | | 11/2002 | Swanson et al. |
| 2004/0204209 A1 | * | 10/2004 | Bosch ...................... 455/575.2 |

OTHER PUBLICATIONS

PCT Notification of Transmittal of the International Search Report, PCT International Search Report mailed Oct. 26, 2004 for PCT/US04/18062 (Filed Jun. 8, 2004).

* cited by examiner

*Primary Examiner*—Matthew D. Anderson
*Assistant Examiner*—Tuan Tran
(74) *Attorney, Agent, or Firm*—Alston & Bird LLP (57) ABSTRACT

A mobile station for receiving and generating wireless communications signals. The mobile station includes layers of translucent materials each having a visual characteristic and overlapping portions that define another visual characteristic. The layers can be used to define keys overlying pressure sensitive regions of a wireless communications signal processing assembly (e.g., dome contacts on a printed wiring board). Keys constructed of two layers have a first and second visual characteristics defined individually by the first and second layers, respectively, and a composite visual characteristic defined by the overlapping portions of the layers. For instance, the first and second visual characteristics may be two different colors that in the overlapping region form a composite color that is aesthetically attractive and distinguishes that portion of the key for easy identification during use. Each of the keys may also include a channel defined between pairs of the plungers to prevent cross-talk between the plungers.

21 Claims, 5 Drawing Sheets

MOBILE STATION HAVING OVERLAPPING TRANSLUCENT MATERIAL LAYERS AND METHOD OF FORMING THE SAME

BACKGROUND OF THE INVENTION

1. Field of the Invention

The present invention is related to the manufacture and use of mobile stations (e.g., mobile telephones), and more particularly to visual modifications of the mobile station to improve its aesthetic appearance and function.

2. Description of Related Art

Participants in the mobile telephone industry are in a constant search to differentiate their telephones by making them easier to use and more aesthetically appealing. For example, mobile telephones have been developed with easily interchangeable covers. An interchangeable cover allows the user to change the appearance of the phone as desired, such as by matching the cover to an outfit.

As another example, U.S. Pat. No. 6,310,609 discloses a user-interface with guide lights. The user interface includes a means for identifying the appropriate keys on the key mat which correspond to the step or steps required to activate a desired operation or function by the device. Identification of the appropriate keys is achieved using a light source which is mounted beneath each translucent key so that when the light source is illuminated, the key associated with that light source will be identifiable by the user.

The intensity of the light sources is variable and may be controlled to provide sufficient contrast to read all keys in low ambient light while highlighting the keys to be pressed for activation of the desired function. In high ambient light, the intensity of the guide lights may be increased for enhanced contrast and visibility. Alternatively, different color light sources may be used, with one color to light all keys for visibility in low ambient light, if needed, and the other color to provide the guide lights.

In yet another example, U.S. Pat. No. 6,466,299 discloses a cover for a mobile station constructed using thermochromic crystals. The thermochromic crystals are sensitive to changes in temperature, responding to such changes with changes in color. Application of the crystals to the cover of the station, or the keys on the key mat, allows the user to see which of the keys have been pressed or whether the phone has been recently used without authorization. In addition, the color changes have the advantage of being aesthetically attractive, differentiating the telephones from others on the market.

Despite all of the above-listed improvements in mobile station appearance and function, further improvements are still desirable. It would therefore be advantageous to have a mobile station with an improved aesthetic appearance. It would be further advantageous if the improved aesthetic appearance were combined with improved function.

BRIEF SUMMARY OF THE INVENTION

The present invention addresses the above needs and achieves other advantages by providing a mobile station having an enhanced aesthetic appearance and being capable of receiving and generating wireless communications signals. The mobile station includes layers of translucent materials, each having a visual characteristic. The layers may overlap such that the overlapping portions define another visual characteristic that is a composite of the respective visual characteristics of the individual layers. For instance, the layers can be used to define keys overlying pressure sensitive regions of a wireless communications signal processing assembly (e.g., dome contacts on a printed wiring board). Keys constructed of two overlapping layers that individually have first and second visual characteristics will have a composite visual characteristic. For instance, the first and second visual characteristics may be two different colors that in the overlapping region form a composite color that is aesthetically attractive and distinguishes that portion of the key for easy identification during use. Thus, a mobile station of the present invention has an enhanced aesthetic appearance by including keys with various visual characteristics as defined by the respective visual characteristics of the translucent material layers that form the keys.

A mobile station of one embodiment of the present invention includes a housing and a wireless communications signal processing assembly positioned in the housing. Also included at least partially within the housing is a first layer of material having a first visual characteristic and a second layer of at least partially translucent material having a second visual characteristic. Portions of the layers are overlapping so as to define a composite visual characteristic, as created by the combination of the first and second visual characteristics of the overlapping layers, visible through the partially translucent material of the second layer. As an example of a type of visual characteristic, the first visual characteristic may be a first color, the second visual characteristic a second color and the composite visual characteristic a composite color formed via chromatic interference between the first and second colors.

In one aspect, the first and second layers may define a number of keys. Thus, the housing may define an opening through which the first and second layers are exposed. Additionally, the first and second layers may be supported by and overlie the wireless communications signal processing assembly.

The processing assembly may have a plurality of pressure-sensitive areas with the plurality of keys arranged to overlie the pressure sensitive areas. As an example, the pressure sensitive areas may be dome contacts on a printed wiring board of the wireless communications signal processing assembly. Each of the pressure sensitive areas is capable of registering an input when a respective one of the overlying keys is pressed. To assist in transmission of the key press, each key may have one or more plungers. The plungers are positioned on an undersurface of the layers in correspondence with a respective one of the pressure sensitive areas.

As another option, an external surface of the layers may define one or more channels. The channels are positioned between adjacent pairs of the plungers of the same key so as to minimize cross-talk between the plungers which might otherwise disadvantageously result in activation of two adjacent pressure sensitive areas.

In one embodiment, the overlapping portions of the first and second layers have a thickness equal to the remainder of the layers. Preferably, each of the overlapping portions of this embodiment is approximately one-half of the total thickness.

The mobile station may also include a display and a bezel extending around and supporting the display. The bezel may also support portions of the first and second layers. The portions of the first and second layers supported by the bezel may also be integrally connected to the portions of the layers defining one of the keys.

The mobile station of the present invention has many advantages. For example, the overlapping layers that form the keys of the mobile station each have a visual characteristic that combines into a composite visual characteristic to increase the aesthetic appeal of the mobile station. Additionally, the difference in visual characteristics can be used to emphasize different functional aspects of the mobile station so as to aid in the location and identification of the keys that must be depressed to activate a particular function. Advantageously, the keys may also define channels to reduce cross-talk between different plungers that may be selected by depressing different portions of the same key.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figures 1, 2:
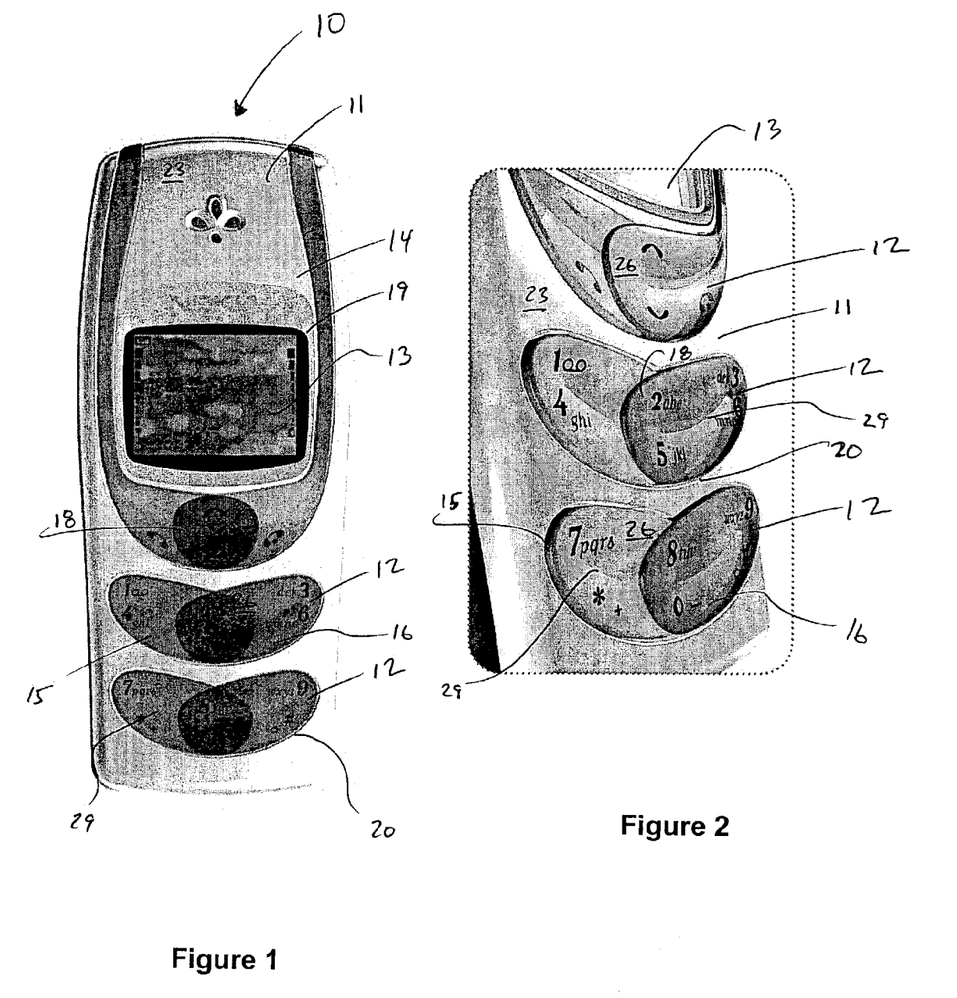
FIG. 1 is a plan view of a mobile telephone of one embodiment of the present invention having two overlapping layers each having a different visual characteristic and defining a composite visual characteristic in an overlapping region.
FIG. 2 is an enlarged perspective view of a plurality of keys formed by the overlapping layers of the mobile telephone of FIG. 1.

A mobile station 10 of one embodiment of the present invention is shown in FIG. 1. Included in the mobile station is a face cover 11 that forms part of a housing, a plurality of keys 12 and a display 13. The cover 11 includes a bezel 14 which is the portion of the cover extending around and supporting the display. As described below, the keys 12 are constructed of at least first and second layers, 15 and 16, with at least the second layer and, more commonly, both the first and second layers being formed of a translucent material. Each of the first and second layers has a different visual characteristic, such as a different color. Advantageously, a portion 17 of the first layer overlaps a portion 18 of the second layer with the overlapped portions forming a composite visual characteristic, such as a composite color, for improved aesthetic appearance and easier identification of the keys, as is shown best in FIG. 2.

It should be understood, that the mobile telephone illustrated and hereinafter described is merely illustrative of one type of mobile station that would benefit from the present invention and, therefore, should not be taken to limit the scope of the present invention. For example, other types of mobile stations, such as portable digital assistants (PDAs), pagers, laptop computers and other types of voice and text communications systems, can readily employ the present invention. Moreover, the system and method of the present invention will be primarily described in conjunction with mobile communications applications. But the system and method of the present invention can be utilized in conjunction with a variety of other applications, both in the mobile communications industries and outside of the mobile communications industries.

Figure 3:
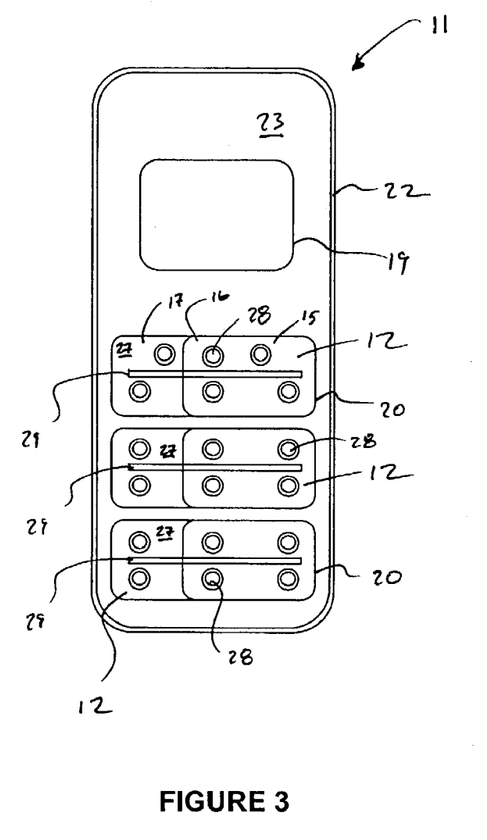
FIG. 3 is a plan view of an inside surface of a face cover and an undersurface of several keys of a mobile telephone of another embodiment of the present invention.
Figure 4:
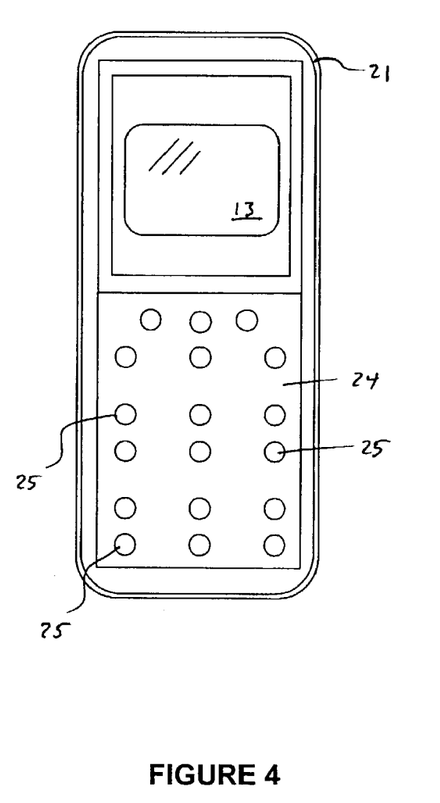
FIG. 4 is a plan view of a printed wiring board, display and other components of a wireless communications signal processing assembly of a mobile telephone of another embodiment of the present invention.

As is shown in another embodiment illustrated in FIGS. 3 and 4, the housing of the mobile station 10 includes a back cover 21 in addition to the face cover 11. Together, the face cover 11 and the back cover 21 form the housing which serves to protect the remaining portions of the mobile station 10. Although the face cover 11 and the back cover may be constructed in various manners, the face cover illustrated in FIG. 3 and the back cover illustrated by FIG. 4 have a roughly rectangular shape with relatively thin walls formed of a plastic material. Also, the face cover typically defines a plurality of openings for the keys, the display and the like.

For example, the illustrated face cover 11 has a generally planar face portion 23 and a wall structure 24 extending away from the peripheral edges of the planar face portion. The planar face portion 23 includes the bezel 14 that defines a display opening 19 through which the display 13 is visible. Also defined in the planar face portion are key openings 20 through which the keys 12 protrude to be accessible by the user. In the embodiment illustrated in FIG. 3, there are three equally sized key openings 20, while in the embodiment illustrated in FIG. 1, there are two equally sized key openings and a top, smaller key opening (using the orientation of the mobile station in FIG. 1) adjacent the display 13 that extends smoothly upward into the bezel area 14 for extra decorative effect.

The back cover 21 of the embodiment illustrated in FIG. 4 mates with the face cover 11 and supports a printed wiring board 24, the display 13 and other conventionally known components (battery, microphone, processor, etc.) necessary for the mobile station to receive, process and generate wireless communications signals. Collectively, these components will be referred to herein as a wireless communications signal processing assembly which, being known to those of skill in the art, are not described in greater detail herein.

Both the face and back covers 11 and 21 are preferably constructed of a relatively hard plastic material that is both light weight and protective. In addition, the housing is not necessarily limited to a collection of covers or any particular shape, material or configuration as long as the remaining components of the mobile station 10 are held together in a manner sufficient to operate.

The printed wiring board 24, as shown in FIG. 4, may include a plurality of metal dome contacts 25 that allow a user to provide inputs to the processing assembly. Each of the contacts performs one or more allotted input functions, such as entry of a number for dialing or paging through menu selections. Movement of the dome contacts 25 is preferably in fractions of a millimeter, and more preferably 0.2 mm or less (with respect to a direction orthogonal to the front face of the printed wiring board 24) allowing relatively small movements to register an input.

It should be noted that in addition to the contacts 25 and printed wiring board 24, other devices could be used to sense the application of pressure. For instance, piezoelectric tablets could be positioned on the printed wiring board 24 to record depression of the keys 12. Therefore, pressure sensitive areas as used herein in reference to the wireless signal processing assembly, and its component parts, refers to a device, or collection of devices, or other structure capable of recording the application of pressure, typically produced by the depression or actuation of one of the keys, for the purpose of registering an input to the processing assembly.

Figure 5:
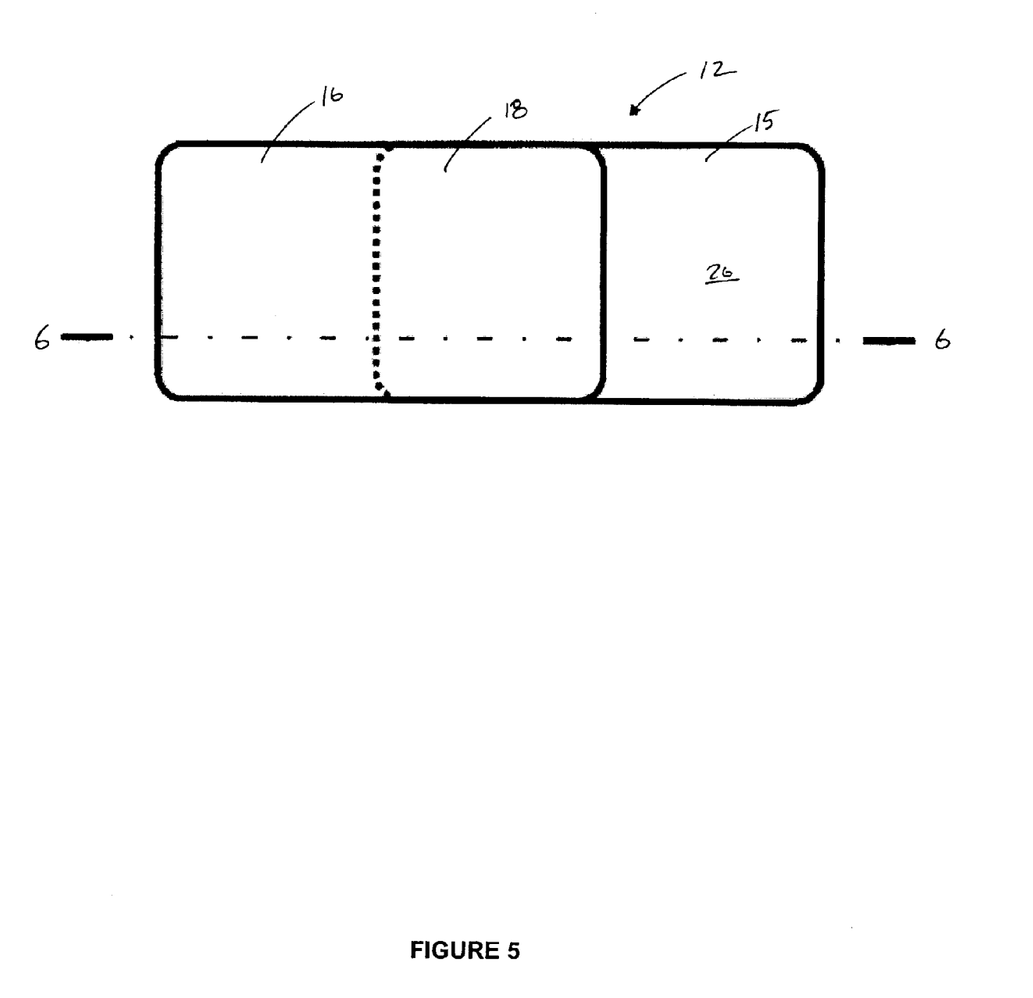
FIG. 5 is a plan view of an external surface of one of the keys of the mobile telephone of FIG. 3 showing the overlapping layers of the key.
Figure 6:
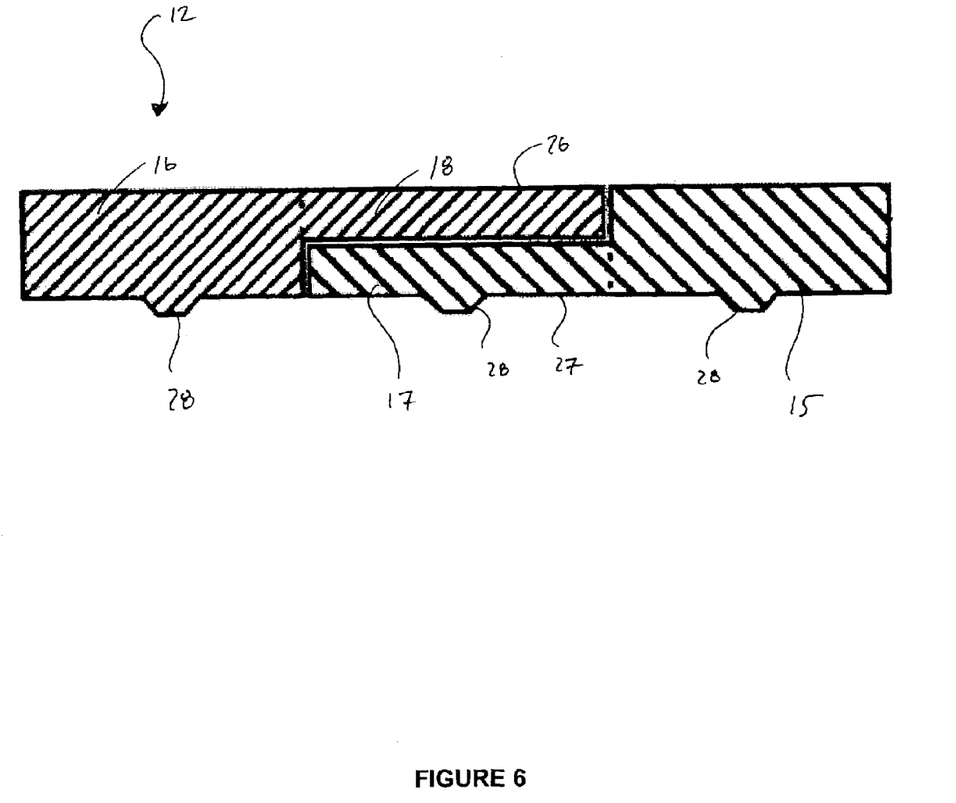
FIG. 6 is a cross-sectional view of the key shown in FIG. 5 taken along line 6—6.
Figure 7:
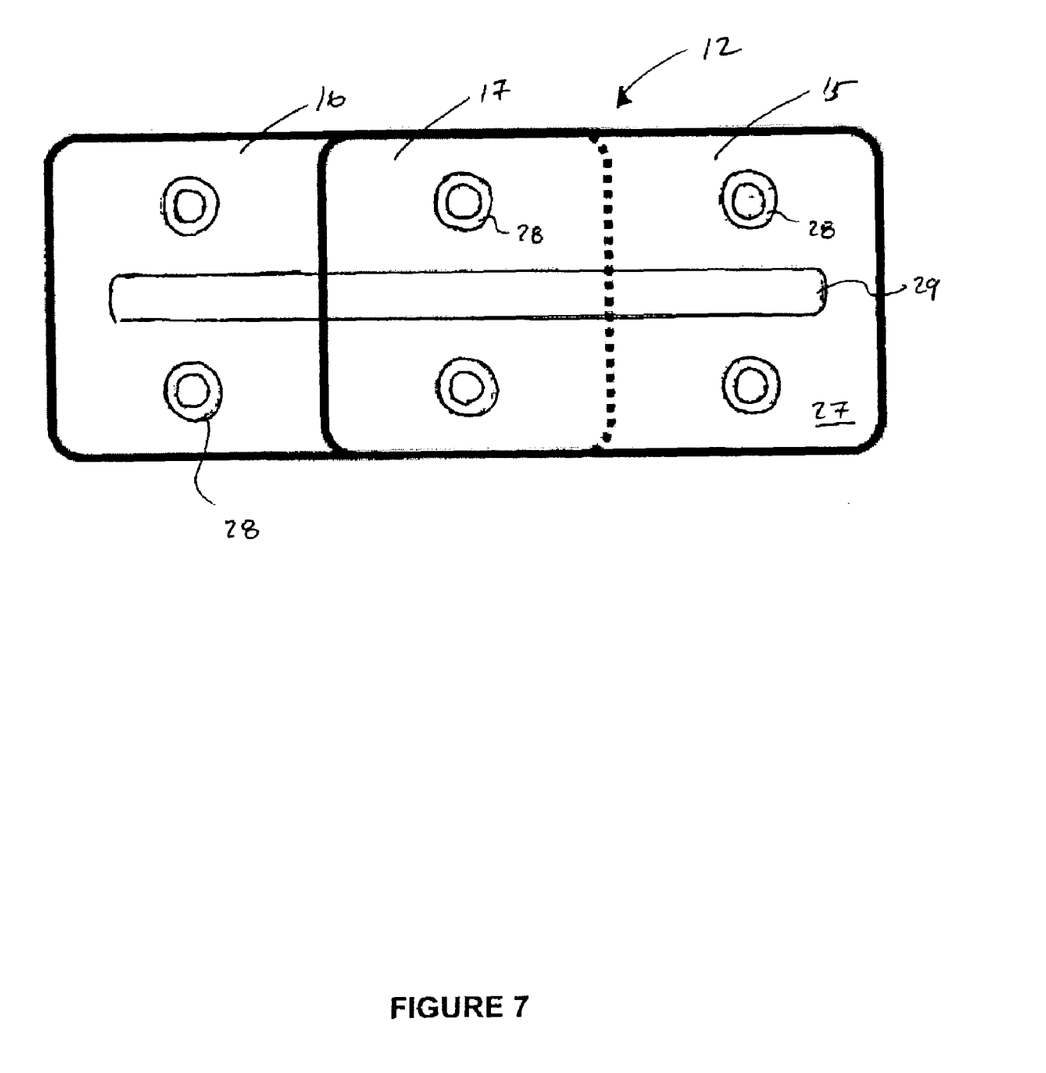
FIG. 7 is an undersurface view of the key shown in FIG. 5, including a channel and several plungers.

As noted above, the keys 12 in the illustrated embodiments are constructed of at least first and second layers, 15 and 16, of translucent material that have overlapping portions. FIGS. 5, 6 and 7 illustrate one of the keys 12 of FIG. 3 in greater detail. In particular, an external surface 26 of the key as it would be visible extending through the respective key opening 20 defined in the face cover 11 is shown in FIG. 5. In this embodiment, the first layer alone forms the rightmost portion of the key, the second layer alone forms the leftmost portion of the key, while overlapping portions of the first and second layers form a center portion of the key. While the entire expanse of the second layer is visible, only a portion of the first layer 15 is visible because its overlapping portion 17 underlies the overlapping portion 18 of the second layer. While the resulting key of FIG. 5 has leftmost, center and rightmost portions (relative to the orientation of FIG. 5) that are of approximately equal size, the different portions of the key may have different sizes if desired, such as by enlarging one portion that is used more frequently and reducing the other portions that are used less frequently.

The overlapping portions 17, 18 of the key of FIG. 5 are further illustrated in cross-section in FIG. 6. Each of the overlapping portions has a thickness that is a fraction of the remainder of its respective layer. In the illustrated cross-section, each of the overlapping portions has a thickness of about one-half the thickness of the remainder of the layer. Advantageously, this allows the sum of the thickness of the two overlapping portions 17, 18 to be about equal to the remainder of the layers 15, 16 so that the thickness of the key is relatively constant.

Overlap between layers could also be achieved without a reduction in thickness, but the overall thickness of the overlapping portions of the key would increase significantly versus the non-overlapping portions, such as is shown by overlap of the two layers of the keys 12 illustrated in FIGS. 1 and 2. The increase in thickness of the overlapping portions could serve as a tactile landmark for locating the overlapping portions when the visual characteristics of the layers are not visible.

The amount of overlap between the layers 15, 16 is defined by the area of the smaller one of the overlapping portions 17, 18. However, in both of the illustrated embodiments, the areas of the overlapping portions are equal so that the composite color (or other visual characteristic) defined thereby is symmetrical. For instance, in the embodiment illustrated in FIGS. 3–7, the overlapping portions 17, 18 are rectangular and have an equal height and width so as to have matching areas and completely overlap each other.

FIG. 7 illustrates an undersurface or internal surface 27 of the key that faces, and may be placed adjacent to, the printed wiring board 24 so as to facilitate compression of the metal dome contacts 25. At the undersurface 27, the second layer of the illustrated embodiment comprises the smaller portion (about ⅓) because its overlapping portion 18 is exterior to the overlapping portion 17 of the first layer. Beyond the change of apparent overlap from this view, FIG. 7 also shows a plurality of plungers 28 extending from the undersurface 27 so as to be able to make contact, either directly or indirectly, with the metal dome contacts 25 of the printed wiring board 24.

As shown in FIG. 6, each of the illustrated plungers 28 has a frusto-conical cross-section with a base that is relatively wider than a plateau region at the distal end. When the mobile station 10 is assembled, the face cover 11 holds the keys 12 in a position that places each of the plungers 28 in alignment, and typically in contact with, a respective metal dome contact 25. To facilitate the face cover 11 holding the keys against the contacts, each of the keys may include a flange extending around its periphery which is trapped between the face cover and the printed wiring board 24. Advantageously, the raised profile and relatively small area of the plateaus region of each of the plungers 28 facilitates transmission of pressure applied to the key through to the underlying metal dome contact.

Although the plungers 28 are illustrated in FIGS. 6 and 7 as having the frusto-conical shape, the plungers may have other shapes, such as cylindrical or square shapes, especially if those shapes tend to reduce the surface area through which the key press is being transmitted so as to increase the pressure and likelihood of proper key press detection by the underlying pressure sensitive areas. As another alternative, the contacts 25 may be directly actuated by the keys such that plungers 28 may not even be necessary.

Each of the keys 12 of the illustrated embodiment is capable of depressing multiple ones of the plungers 28, and in particular, each of the keys is capable of selectively transmitting pressure to any one of six plungers. In the illustrated embodiments, ten of the twelve plungers selectable by the bottom two keys typically correspond to Arabic numerals used to dial telephone numbers, but of course can be customized with different functions or different numbering or lettering. The remaining two plungers associated with the bottom key are typically used to activate special symbols such as the "*" and "#" symbols. The top key corresponds to six plungers that are generally allocated to an answer/hang up key and menu selection keys allowing the user to page through various menus on the display 13. However, the plungers associated with the top key may also correspond to different functions. Moreover, each key may be associated with different numbers of plungers that may be individually actuated by depressing different portions of the key.

As shown in FIG. 7, defined on the undersurface 27 of the key is an optional groove or channel 29 that extends between adjacent pairs of the plungers 28. The channel 29 extends across the two layers 15 and 16, including the overlapping portion 17 of the first layer. Effectively, the channel 29 reduces the thickness of the layers 15, 16 so as to minimize cross-talk between the plungers 28, or if no plungers are present, to minimize cross-talk between the metal dome contacts. In other words, the reduced thickness allows increased deflection at the channel 29 so that the depression of one portion of the key causes the adjacent portion of the key on the other side of the channel to deflect less, thereby reducing the likelihood of erroneously depressing its respective metal dome contact 25.

The channel 29 of the embodiments illustrated in FIGS. 3 and 7, extends laterally so as to be positioned between vertically spaced pairs of the plungers 28 which in the illustrated embodiment are closer than the horizontal spacing between the pairs of plungers. However, the channel 29 need not be straight, nor extend in any particular direction, and can be customized to the placement of the plungers, contacts 25 or other pressure sensitive areas wherein cross talk is likely. For instance, additional channels may be defined vertically on the undersurface 27 so as to be between horizontally adjacent pairs. As a result, each of the keys 12 could have several channels defining a grid to isolate each of the plungers 28. As another alternative, each of the keys may be surrounded by a circular or other channel forming a closed loop.

As another alternative, the channel 29 may be defined on the external surface 26 of the keys 12, as is shown by the embodiment illustrated in FIGS. 1 and 2. Each of the keys of FIGS. 1 and 2 has a smooth kidney shape that extends over a total of six of the of the plungers 28 (e.g., corresponding to six contacts 25 defining inputs for the numbers 1 through 6). The external surface 26 of each of the keys is raised about the edges of the key and gradually extends downward to form a shallow channel 29 extending laterally in two separate curved arc portions along the approximate center of each of the layers 15, 16.

As shown in FIG. 2, there is also a discontinuity between the combined thickness of the overlapping portions 17 and 18 when compared to the first layer 15 or second layer individually, which causes a sudden drop in the surface height between the first and second layers. Advantageously, this discontinuity also serves as a channel 29, effectively increasing flexibility of the keys 12 between two of the laterally spaced pairs of plungers 28 and contacts 25 (e.g., numbers 1 and 2, or 4 and 5).

Each of the first layer 15 and second layer 16 has a visually detectable characteristic that is combined into a composite visually detectable characteristic at the overlapping portions 17, 18. In the embodiment illustrated in FIGS. 1 and 2, the visual characteristics are different colors for each layer 15, 16 that combine in the overlapping portions 17, 18 to form a composite color. To facilitate this, the second layer 16 is at least partially translucent, allowing the passage of some light through to the underlying first layer 15 so that the visual characteristic of the first layer is visible through the second layer to combine with the second layer's visual characteristic. For instance, the first layer 15 may have a blue color and the second layer 16 may have a red color which combine in the overlapping portions 17 and 18 to form a purple color. Two layers of the same color could be combined to darken the shade of the color in the overlapping portions. Generally, the phenomena of two overlapping colors forming a composite color is referred to herein as chromatic interference.

Examples of other visually-detectable characteristics include indicia, such as the user's name, a company name, a trade mark or symbol, textures, grains, fluorescence, etc. Visually detectable characteristics also include patterns, luminescence, reflective qualities, etc. Visually detectable characteristics, therefore, include any of a range of colors, images, indicia or other visible depictions or characteristics that allow alteration of the mobile station's appearance or communicates information about the mobile station, such as the owner or distributor of the mobile station. In one example, two different repeating patterns on each of the layers 15, 16 could result in a composite moiré pattern visible in the overlapping portions 17, 18. Different types of visible characteristics may also be combined, e.g., a color and symbol could overlap in order to fill a portion of the symbol with the color.

Preferred materials for the keys 12 include a clear silicone material or other transparent or partially translucent (i.e., permits the passage of some light) material with sufficient elasticity to locally deform when pressed with a fingertip. The clear silicone has the advantage of being completely transparent and relatively elastic so that individual ones of the plungers 28 may be depressed without exerting sufficient pressure on the remaining plungers under the key to activate the remaining plungers, thereby avoiding cross-talk. Advantageously, having each key cover several of the plungers allows the keys to be relatively large and allows for distinctly visible visual characteristics and relatively large overlapping portions 17 and 18.

Although the illustrated embodiments show only two overlapping layers, the present invention can be extended to several overlapping layers. For instance, a third overlapping layer could be applied under the first and second layers 15, 16 wherein both the first and second layers are at least partially translucent. Each of the three layers has a separate visible characteristic with portions of overlap between any two of the layers, or all three of the layers to define multiple additional combined visually detectable characteristics.

Other configurations for the keys 12 could also be constructed of the overlapping layers 15, 16 of the present invention. For example, a separate key could be used with each number, symbol or other function, in which case the channel 29 would not be necessary and the keys 12 could be constructed of a relatively inflexible material. For instance, the layers 15, 16 of the keys could be made of a polycarbonate, glass or other material having the visual characteristic. It should also be noted that the keys 12 could also be smaller or larger, and have different shapes, depending upon the number of plungers 28 or pressure sensitive areas (metal dome contacts 25) depressible by the keys.

The overlapping layers 14 and 15 of the present invention may be constructed using different processes, either separately, or in combination. For instance, the layers may be formed together in a mold. A thermoformable material, such as a clear or translucent silicone or polymer is dispensed into the mold which defines the shape of one of the keys 12 so as to form the second layer 16 at the bottom of the mold. Once the second layer has cured, the first layer 15 is similarly applied by heating and injection into the mold over the second layer 16 and then cured.

Combined molding works particularly well when constructing the keys 12 illustrated in FIGS. 1 and 2 due to the raised overlapping region of the second layer 16. For the keys illustrated in FIGS. 5–7, separate molding of the layers and then later combination through heating or sonic welding is preferred. Once the layers have been combined in an overlapping relationship, they are removed from the mold and then positioned on the wireless communications assembly, such as over the contacts 25 of the printed wiring board 24. At this step, if the undersurface 27 of the keys 12 have the plungers 28, the plungers are positioned to overlie the contacts 25.

Once the layers have been positioned, the openings 19 and 20 of the face cover 11 are positioned over the keys 12 and the display 13 and the face cover is attached to the back cover 21. It should be noted that the overlapping layers 15, 16 of the present invention may also be applied to other portions of the mobile station 10, exclusive of, or in addition to, the keys 12. Use on the keys, however, is particularly advantageous in that the different visually detectable characteristics may be used to differentiate the locations of different functions.

The present invention has many advantages. For example, the overlapping layers 15, 16 each have a visual characteristic that combines into a composite visual characteristic at the overlapping portions 17, 18 to increase the aesthetic appeal of the mobile station 10. Additionally, the difference in visual characteristics can be used to emphasize different functional aspects of the mobile station so as to aid in the location and identification of the keys required to be depressed to activate a desired function. Further, the use of channels 29 defined by the keys minimizes cross-talk between the areas of keys capable of activating different functions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A mobile station for receiving and generating wireless communications signals, said mobile station comprising:
   a housing;
   a wireless communications signal processing assembly positioned in the housing;
   a first layer of at least partially translucent material having a first visual characteristic; and
   a second layer of at least partially translucent material having a second visual characteristic wherein the first and second layers are at least partially disposed within the housing, and wherein a portion of the second layer overlies a portion of the first layer to form an at least partially translucent overlapping portion with a planar face having an externally detectable, composite visual characteristic created by light transmission through the at least partially translucent material of the first and second layers of the at least partially translucent overlapping portion.

2. A mobile station of claim 1, wherein the housing defines an opening and the first and second layers are exposed through the opening in the housing.

3. A mobile station of claim 2, wherein processing assembly has a plurality of pressure-sensitive areas each capable of registering an input and wherein the first and second layers comprise at least one key overlying at least one of the pressure sensitive areas, said key being capable of exerting pressure on the pressure sensitive area when pressed.

4. A mobile station of claim 3, wherein the key includes at least one plunger positioned on an undersurface of one of the layers and overlying a respective one of the pressure sensitive areas.

5. A mobile station of claim 3, wherein the key includes a plurality of plungers positioned on an undersurface of the layers and overlying respective ones of the pressure sensitive areas.

6. A mobile station of claim 5, wherein the key includes a channel defined by a surface of the layers, said channel being positioned between at least one pair of adjacent plungers.

7. A mobile station of claim 3, further comprising a display, wherein the housing includes a bezel extending around and supporting the display and defining an opening through which portions of the layers are visible.

8. A mobile station of claim 7, wherein layers defining the key and supported by the bezel are integrally connected.

9. A mobile station of claim 3, wherein the pressure sensitive areas are dome contacts on a printed wiring board of the wireless communications signal processing assembly.

10. A mobile station of claim 3, wherein the composite visual characteristic formed by the first and second layers extends across an entire width of the key.

11. A mobile station of claim 1, wherein the first visual characteristic is a first color, the second visual characteristic is a second color, and the composite visual characteristic a composite color formed via chromatic interference between the first and second colors.

12. A mobile station for receiving and generating wireless communications signals, said mobile station comprising:
    a housing;
    a wireless communications signal processing assembly positioned in the housing;
    a first layer of material having a first visual characteristic; and
    a second layer of at least partially translucent material having a second visual characteristic,
    wherein the first and second layers are at least partially disposed within the housing,
    wherein a portion of the second layer overlies a portion of the first layer to form an overlapping portion having a composite visual characteristic,
    wherein the housing defines an opening and the first and second layers are exposed through the opening in the housing,
    wherein processing assembly has a plurality of pressure-sensitive areas each capable of registering an input,
    wherein the first and second layers comprise at least one key overlying at least one of the pressure sensitive areas, said key being capable of exerting pressure on the pressure sensitive area when pressed,
    wherein the key includes a plurality of plungers positioned on an undersurface of the layers and overlying respective ones of the pressure sensitive areas,
    wherein the key includes a channel defined by a surface of the layers, said channel being positioned between at least one pair of adjacent plungers, and
    wherein a total thickness of the overlapping portions of the first and second layers equals a thickness of the of the remainder of the layers.

13. A mobile station of claim 12, wherein each of the overlapping portions is approximately one-half of the total thickness.

14. A method of configuring a mobile station capable of supporting wireless communications to have multiple visual characteristics, said method comprising:
    disposing a first layer of at least partially translucent material having a first visual characteristic at least partially within a housing so as to be visible;
    disposing a second layer of at least partially translucent material having a second visual characteristic at least partially within the housing so as to be visible; and
    wherein a portion of the first layer and a portion the second layer overlap to form an at least partially translucent overlapping portion with a planar face with an externally detectable, composite visual characteristic created by light transmission through the at least partially translucent material of the first and second layers of the at least partially translucent overlapping portion.

15. A method of claim 14, further comprising forming the first and second layers before disposing the layers at least partially within the housing.

16. A method of claim 15, wherein forming the layers includes molding the first and second layers in a mold.

17. A method of claim 16, wherein forming the layers further includes dispensing the second layer into the mold and then dispensing the first layer into the mold such that the portion of the first layer overlies the portion of the second layer.

18. A method of claim 17, wherein the overlapping portions are adhered to each other and wherein the layers are removed simultaneously from the mold and disposed simultaneously at least partially within the housing.

19. A method of claim 14, wherein forming the layers includes forming a plurality of plungers on an undersurface of the layers.

20. A method of claim 19, wherein disposing the layers at least partially within the housing includes overlaying the plungers against corresponding pressure sensitive areas of the wireless communications signal processing assembly that is also disposed within the housing.

21. A mobile station of claim 14, further comprising forming at least one key from the first and second layers wherein the composite visual characteristic extends across an entire width of the key.

\* \* \* \* \*